US007664761B2

(12) United States Patent
Ishida (10) Patent No.: US 7,664,761 B2
(45) Date of Patent: Feb. 16, 2010

(54) APPARATUS AND METHOD FOR SEARCHING DATA FOR A SIMILAR ARTICLE

(75) Inventor: Tomotoshi Ishida, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 11/514,218

(22) Filed: Sep. 1, 2006

(65) Prior Publication Data
US 2007/0100810 A1   May 3, 2007

(30) Foreign Application Priority Data
Oct. 28, 2005  (JP) .............................. 2005-315276

(51) Int. Cl.
 *G06F 7/00* (2006.01)
 *G06F 17/00* (2006.01)
 *G06F 17/30* (2006.01)
(52) U.S. Cl. .......................................... 707/100; 707/3
(58) Field of Classification Search ................ 707/100, 707/6, 3; 705/28, 29; 700/107
See application file for complete search history.

(56) References Cited

U.S. PATENT DOCUMENTS

| 5,971,589 | A | * | 10/1999 | Hazama et al. | ............. | 700/145 |
| 6,065,857 | A | * | 5/2000 | Hazama et al. | ............. | 700/95 |
| 6,185,476 | B1 | * | 2/2001 | Sakai | ............. | 700/182 |
| 6,327,514 | B1 | * | 12/2001 | Hazama et al. | ............. | 700/145 |
| 7,117,163 | B1 | * | 10/2006 | Iyer et al. | ............. | 705/10 |
| 2003/0069656 | A1 | * | 4/2003 | Minami et al. | ............. | 700/95 |
| 2003/0233160 | A1 | * | 12/2003 | Ishida | ............. | 700/106 |

FOREIGN PATENT DOCUMENTS

| JP | 11-184861 | 7/1999 |
| JP | 11-195036 | 7/1999 |
| JP | 2002-041534 | 2/2002 |
| JP | 2003-114899 | 4/2003 |
| JP | 2003-186888 | 7/2003 |
| JP | 2004-021675 | 1/2004 |

OTHER PUBLICATIONS

Makoto, JP-2002-041534, Feb. 8, 2002, English translation of Japanese Patent cited in Applicant's IDS dated Oct. 5, 2006.*

* cited by examiner

*Primary Examiner*—James Trujillo
*Assistant Examiner*—Jeffrey A Burke
(74) *Attorney, Agent, or Firm*—Antonelli, Terry, Stout & Kraus, LLP.

(57) ABSTRACT

An apparatus and method for quickly retrieving and outputting assemblies or subassemblies similar to a target assembly or subassembly for similar determination are provided. Data concerning assemblies, and the subassemblies and parts contained in the assemblies is retrieved from a product structure data storage device; hierarchical structures of the assemblies and subassemblies are detected; similarity is calculated for all the combinations of the assemblies and subassemblies based on the detected hierarchical structures; and the hierarchical structures of the assemblies and subassemblies and similarity for each combination of assemblies and subassemblies are stored in a similar data storage device. When a target assembly or subassembly for similarity determination is inputted via an input device, assemblies or subassemblies similar to the target assembly or subassembly are retrieved from the similar data storage device, and the retrieved assemblies and subassemblies are displayed on a display device.

10 Claims, 13 Drawing Sheets

| STRUCTURE | | | THE NUMBER OF COMPONENT PART | PART NAME | SIMILAR ARTICLE |
|---|---|---|---|---|---|
| LEVEL 1 | LEVEL 2 | LEVEL 3 | | | |
| 8S-B06 | | | 1 | TUB PART ASSEMBLY 8 | 88:7S-B06, 85:9S-B06 |
| | 8S-A06 | | 1 | OUTER TUB PART ASSEMBLY 8 | 87:7S-A06, 85:9S-A06 |
| | | 8S-05 | 4 | HANGING BAR | |
| | | 8S-06 | 1 | OUTER TUB 8 | |
| | | 60R6-45 | 1 | DRAIN VALVE | |
| | | 8S-07 | 1 | HOSE | |
| | | 7R1-37 | 1 | HOSE HOLDER | |
| | | 7R1-Z37 | 2 | SCREW | |
| | | 52X-63 | 1 | TUBE | |
| | | 52X-02 | 1 | TUBE CLIP | |
| | 8S2-A02 | | 1 | BASKET PART ASSEMBLY 8 | 90:9S2-A02, 85:7S2-A02 |
| | | 8S2-02 | 1 | BASKET 8 | |
| | | 8S2-A03 | 1 | ROTARY BLADE PART ASSEMBLY | |
| | | 8S2-04 | 1 | TUB COVER | |
| | | 8S2-05 | 1 | LINT FILTER | |
| | | 8S2-29 | 1 | WASHING POCKET | |

| PARENT PART | CHILD PART | THE NUMBER OF COMPONENT PART | ATTRIBUTE | . . . |
|---|---|---|---|---|
| ASSEMBLY A1 | SUBASSEMBLY B1 | 2 | . . . | . . . |
| ASSEMBLY A1 | PART C3 | 1 | . . . | . . . |
| ASSEMBLY A1 | SUBASSEMBLY B2 | 1 | . . . | . . . |
| SUBASSEMBLY B1 | PART C2 | 1 | . . . | . . . |
| SUBASSEMBLY B1 | PART C1 | 1 | . . . | . . . |
| SUBASSEMBLY B2 | PART C1 | 1 | . . . | . . . |
| SUBASSEMBLY B2 | PART C4 | 4 | . . . | . . . |
| ASSEMBLY A2 | SUBASSEMBLY B2 | 1 | . . . | . . . |
| ASSEMBLY A2 | PART C5 | 1 | . . . | . . . |
| ASSEMBLY A3 | SUBASSEMBLY B2 | 1 | . . . | . . . |
| ASSEMBLY A3 | PART C2 | 1 | . . . | . . . |
| ASSEMBLY A3 | PART C6 | 1 | . . . | . . . |
| ASSEMBLY A3 | SUBASSEMBLY B3 | 1 | . . . | . . . |
| SUBASSEMBLY B3 | PART C1 | 2 | . . . | . . . |
| SUBASSEMBLY B3 | PART C5 | 1 | . . . | . . . |

FIG. 5

| ASSEMBLY, SUBASSEMBLY | PART |
|---|---|
| ASSEMBLY A1 | PART C1 |
| | PART C2 |
| | PART C3 |
| | PART C4 |
| ASSEMBLY A2 | PART C1 |
| | PART C4 |
| | PART C5 |
| ASSEMBLY A3 | PART C1 |
| | PART C2 |
| | PART C4 |
| | PART C5 |
| | PART C6 |
| SUBASSEMBLY B1 | PART C1 |
| | PART C2 |
| SUBASSEMBLY B2 | PART C1 |
| | PART C4 |
| SUBASSEMBLY B3 | PART C1 |
| | PART C5 |

FIG. 6

| ASSEMBLY, SUBASSEMBLY | PART | THE NUMBER OF COMPONENT PART |
|---|---|---|
| ASSEMBLY A1 | PART C1 | 3 |
| | PART C2 | 2 |
| | PART C3 | 1 |
| | PART C4 | 4 |
| ASSEMBLY A2 | PART C1 | 1 |
| | PART C4 | 4 |
| | PART C5 | 1 |
| ASSEMBLY A3 | PART C1 | 1 |
| | PART C2 | 1 |
| | PART C4 | 6 |
| | PART C5 | 1 |
| | PART C6 | 1 |
| SUBASSEMBLY B1 | PART C1 | 1 |
| | PART C2 | 1 |
| SUBASSEMBLY B2 | PART C1 | 1 |
| | PART C4 | 4 |
| SUBASSEMBLY B3 | PART C1 | 2 |
| | PART C5 | 1 |

FIG. 7

| ASSEMBLY, SUBASSEMBLY 1 | ASSEMBLY, SUBASSEMBLY 2 | SIMILARITY |
|---|---|---|
| ASSEMBLY A1 | ASSEMBLY A2 | 57% |
| ASSEMBLY A1 | ASSEMBLY A3 | 67% |
| ASSEMBLY A1 | SUBASSEMBLY B1 | 67% |
| ASSEMBLY A1 | SUBASSEMBLY B2 | 67% |
| ASSEMBLY A1 | SUBASSEMBLY B3 | 33% |
| ASSEMBLY A2 | ASSEMBLY A1 | : |
| ASSEMBLY A2 | ASSEMBLY A3 | : |
| ASSEMBLY A2 | SUBASSEMBLY B1 | : |
| ASSEMBLY A2 | SUBASSEMBLY B2 | : |
| ASSEMBLY A2 | SUBASSEMBLY B3 | : |
| ASSEMBLY A3 | ASSEMBLY A1 | : |
| : | : | : |
| SUBASSEMBLY B1 | ASSEMBLY A1 | 67% |
| SUBASSEMBLY B1 | ASSEMBLY A2 | 40% |
| SUBASSEMBLY B1 | ASSEMBLY A3 | 57% |
| SUBASSEMBLY B1 | SUBASSEMBLY B2 | 50% |
| SUBASSEMBLY B1 | SUBASSEMBLY B3 | 0% |
| : | : | : |

| STRUCTURE | | | ASSEMBLY A1 | ASSEMBLY A3 |
|---|---|---|---|---|
| LEVEL 1 | LEVEL 2 | LEVEL 3 | | |
| ASSEMBLY A1 | | | 1 | 0 |
| ASSEMBLY A3 | | | 0 | 1 |
| | SUBASSEMBLY B1 | | 2 | 0 |
| | SUBASSEMBLY B3 | | 0 | 1 |
| | | PART C2 | 1 | 0 |
| | | PART C1 | 1 | 2 |
| | | PART C5 | 0 | 1 |
| | PART C2 | | 0 | 1 |
| | PART C3 | | 1 | 0 |
| | PART C6 | | 0 | 1 |
| | SUBASSEMBLY B2 | | 1 | 1 |
| | | PART C1 | 1 | 1 |
| | | PART C4 | 4 | 4 |

FIG. 11

| ASSEMBLY A1 | | ASSEMBLY A3 | |
|---|---|---|---|
| STRUCTURE | THE NUMBER OF COMPONENT PART | STRUCTURE | THE NUMBER OF COMPONENT PART |
| ASSEMBLY A1 | 1 | | |
| | | ASSEMBLY A3 | 1 |
| SUBASSEMBLY B1 | 2 | SUBASSEMBLY B3 | 1 |
| | | | |
| PART C2 | 1 | | |
| PART C1 | 1 | PART C1 | 2 |
| | | PART C5 | 1 |
| | | PART C2 | 1 |
| PART C3 | 1 | | |
| | | PART C6 | 1 |
| SUBASSEMBLY B2 | 1 | SUBASSEMBLY B2 | 1 |
| PART C1 | 1 | PART C1 | 1 |
| PART C4 | 4 | PART C4 | 4 |

FIG. 12

| STRUCTURE | | | THE NUMBER OF COMPONENT PART | PART NAME | SIMILAR ARTICLE |
|---|---|---|---|---|---|
| LEVEL 1 | LEVEL 2 | LEVEL 3 | | | |
| 8S-B06 | | | 1 | TUB PART ASSEMBLY 8 | 88:7S-B06, 85:9S-B06 |
| | 8S-A06 | | 1 | OUTER TUB PART ASSEMBLY 8 | 87:7S-A06, 85:9S-A06 |
| | | 8S-05 | 4 | HANGING BAR | |
| | | 8S-06 | 1 | OUTER TUB 8 | |
| | | 60R6-45 | 1 | DRAIN VALVE | |
| | | 8S-07 | 1 | HOSE | |
| | | 7R1-37 | 1 | HOSE HOLDER | |
| | | 7R1-Z37 | 2 | SCREW | |
| | | 52X-63 | 1 | TUBE | |
| | | 52X-02 | 1 | TUBE CLIP | |
| | 8S2-A02 | | 1 | BASKET PART ASSEMBLY 8 | 90:9S2-A02, 85:7S2-A02 |
| | | 8S2-02 | 1 | BASKET 8 | |
| | | 8S2-A03 | 1 | ROTARY BLADE PART ASSEMBLY | |
| | | 8S2-04 | 1 | TUB COVER | |
| | | 8S2-05 | 1 | LINT FILTER | |
| | | 8S2-29 | 1 | WASHING POCKET | |

FIG. 13

| CODE | NAME | TYPE | SIZE | MATERIAL | . . . |
|---|---|---|---|---|---|
| A 1 | ASSEMBLY A1 | . . . | . . . | . . . | . . . |
| A 2 | ASSEMBLY A2 | . . . | . . . | . . . | . . . |
| A 3 | ASSEMBLY A3 | . . . | . . . | . . . | . . . |
| B 1 | SUBASSEMBLY B1 | . . . | . . . | . . . | . . . |
| B 2 | SUBASSEMBLY B2 | . . . | . . . | . . . | . . . |
| B 3 | SUBASSEMBLY B3 | . . . | . . . | . . . | . . . |
| C 1 | PART C1 | T | LARGE | IRON | . . . |
| C 2 | PART C2 | U | LARGE | COPPER | . . . |
| C 3 | PART C3 | V | MEDIUM | ALUMINUM | . . . |
| C 4 | PART C4 | U | MEDIUM | IRON | . . . |
| C 5 | PART C5 | T | SMALL | ALUMINUM | . . . |
| C 6 | PART C6 | V | SMALL | PLASTIC | . . . |

APPARATUS AND METHOD FOR SEARCHING DATA FOR A SIMILAR ARTICLE

BACKGROUND OF THE INVENTION

1. Field of the Invention

The present invention relates to an apparatus and a method for searching for assemblies or subassemblies similar to a designated assembly or subassembly composed of a plurality of parts.

2. Background Art

JP Patent Publication (Kokai) No. 11-195036 A (1999) proposes a method for retrieving data concerning units with an identical part number stored in a plurality of bases.

In the method proposed by JP Patent Publication (Kokai) No. 2003-186888 A, parts are classified in advance depending on their types, and parts having compatible specifications are retrieved.

In the method proposed by JP Patent Publication (Kokai) No. 11-184861 A (1999), part specification values are stored in advance in a vector form, and a part having a similar vector of the specification value is retrieved among certain parts.

Patent Publication (Kokai) No. 2002-41534 A proposes a method for retrieving data concerning similar units stored in a plurality of bases.

Patent Document 1: JP Patent Publication (Kokai) No. 11-195036 A (1999)

Patent Document 2: JP Patent Publication (Kokai) No. 2003-186888 A

Patent Document 3: JP Patent Publication (Kokai) No. 11-184861 A (1999)

Patent Document 4: Patent Publication (Kokai) No. 2002-41534 A

SUMMARY OF THE INVENTION

In accordance with the method disclosed in JP Patent Publication (Kokai) No. 11-195036 A (1999), it is necessary to input target product numbers for comparison. Further, only the data having the same part number attached to part data can be retrieved. In accordance with the method disclosed in JP Patent Publication (Kokai) No. 2003-186888 A, it is necessary for an operator to input data such as part types for determining similarity, other than target data to be retrieved. In accordance with the method disclosed in JP Patent Publication (Kokai) No. 11-184861 A (1999), it is possible to retrieve an assembly or subassembly having a similar specification value since such assembly or subassembly is treated as one part. However, assemblies or subassemblies having similar component parts cannot be retrieved.

In accordance with the method disclosed in Patent Publication (Kokai) No. 2002-41534 A, while it is possible to retrieve an assembly having common child parts, it is only applicable to cases in which the structure of the assembly is expressed with one parent-child hierarchy. Further, after instructions for retrieval are received, similarity is calculated by retrieving child parts and then retrieving the parent products of the retrieved child parts. Thus, there is a problem that a response takes time when a processing load is large and the number of the parts of a target is large. Furthermore, since the structure has only one hierarchy, similar subassemblies cannot be retrieved simultaneously.

An object of the present invention is to provide an apparatus and a method for quickly retrieving and outputting assemblies or subassemblies similar to a target assembly or subassembly for similarity determination.

In accordance with the present invention, data concerning assemblies, and the subassemblies and parts contained in the assemblies is retrieved from a product structure data storage device; hierarchical structures of the assemblies and subassemblies are detected; similarity is calculated for all the combinations of the assemblies and subassemblies based on the detected hierarchical structures; and the hierarchical structures of the assemblies and subassemblies, and similarity for each combination of the assemblies and subassemblies are stored in a similar data storage device.

When a target assembly or subassembly for similarity determination is inputted via an input device, assemblies or subassemblies similar to the target assembly or subassembly are retrieved from the similar data storage device, and the retrieved assemblies and subassemblies are displayed on a display device.

In accordance with the present invention, assemblies or subassemblies similar to a target assembly or subassembly for similarity determination can be quickly retrieved and outputted.

DESCRIPTION OF PREFERRED EMBODIMENTS OF THE INVENTION

Embodiments of the present invention will be hereafter described with reference to the drawings. First, data used with the apparatus of the present invention for searching data for a similar article will be described.

Figure 2:
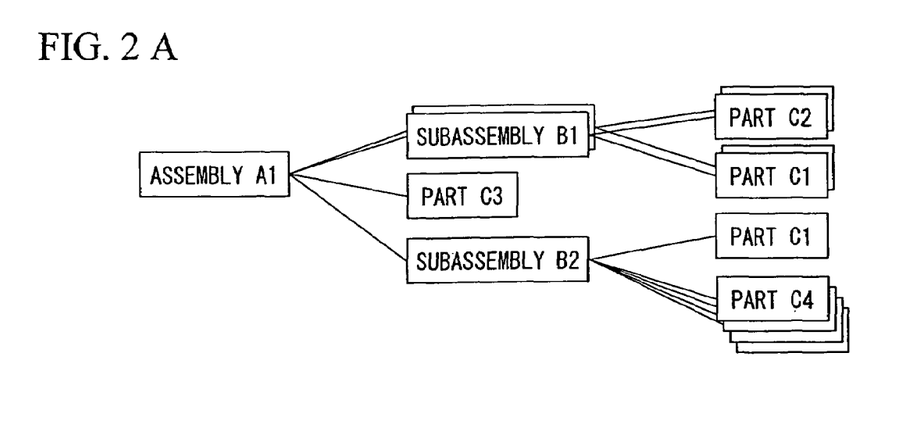
FIG. 2 shows an example of product structure data used with the apparatus for searching data for a similar article according to the present invention.

FIG. 2 shows hierarchical structures representing the structure of three assemblies A1, A2, and A3, and their parts. As shown in FIG. 2(a), the assembly A1 is composed of two subassemblies B1, one part C3, and one subassembly B2. The subassembly B1 is composed of one part C2 and one part C1. The subassembly B2 is composed of one part C1 and four parts C4.

As shown in FIG. 2(b), the assembly A2 is composed of one subassembly B2 and one part C5. The subassembly B2 is composed of one part C1 and four parts C4.

As shown in FIG. 2(c), the assembly A3 is composed of one subassembly B2, one part C2, one part C6, and one subassembly B3. The subassembly B2 is composed of one part C1 and four parts C4. The subassembly B3 is composed of two parts C1 and one part C5.

One of such assembly, subassembly, and part that have inclusion relation with one another is referred to as a parent part, and another as a child part. For example, since the assembly A1 includes two subassemblies B1, the assembly A1 is referred to as a parent part and the subassemblies B1 are child parts between the assembly A1 and the subassemblies B1.

FIG. 2 shows the hierarchical structure of the assemblies A1, A2, and A3. In the three hierarchical structures, assemblies, subassemblies, and parts are classified into three levels. The left column shows highest-order assemblies, the middle column shows subassemblies or parts that are the child parts of the assemblies, and the right column shows parts that are the child parts of the subassemblies. While classification is made into three levels in this example, many more levels may be used for classification.

In the case of an actual product, the highest-order assembly may be an end product or part contained in such end product. Namely, the assembly has a hierarchical structure that can be classified into at least three levels including a child part and a grandchild part.

Figure 3:
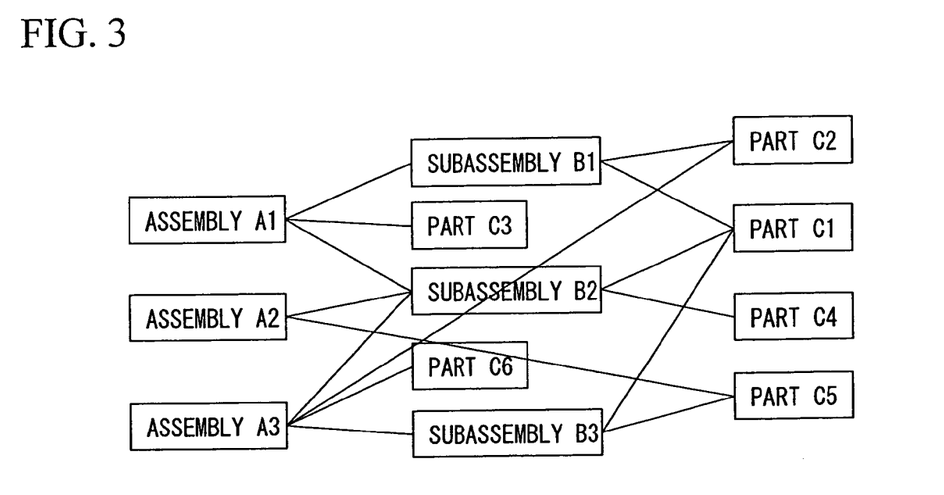
FIG. 3 shows an example of product structure data used with the apparatus for searching data for a similar article according to the present invention.

FIG. 3 shows inclusion relation of the subassemblies and parts that constitute the three assemblies A1, A2, and A3. Note that even when a parent part includes a plurality of child parts, only one child part is shown in FIG. 3. For example, while the assembly A1 includes three subassemblies B1, only one subassembly B1 is shown in FIG. 3.

Figure 4:
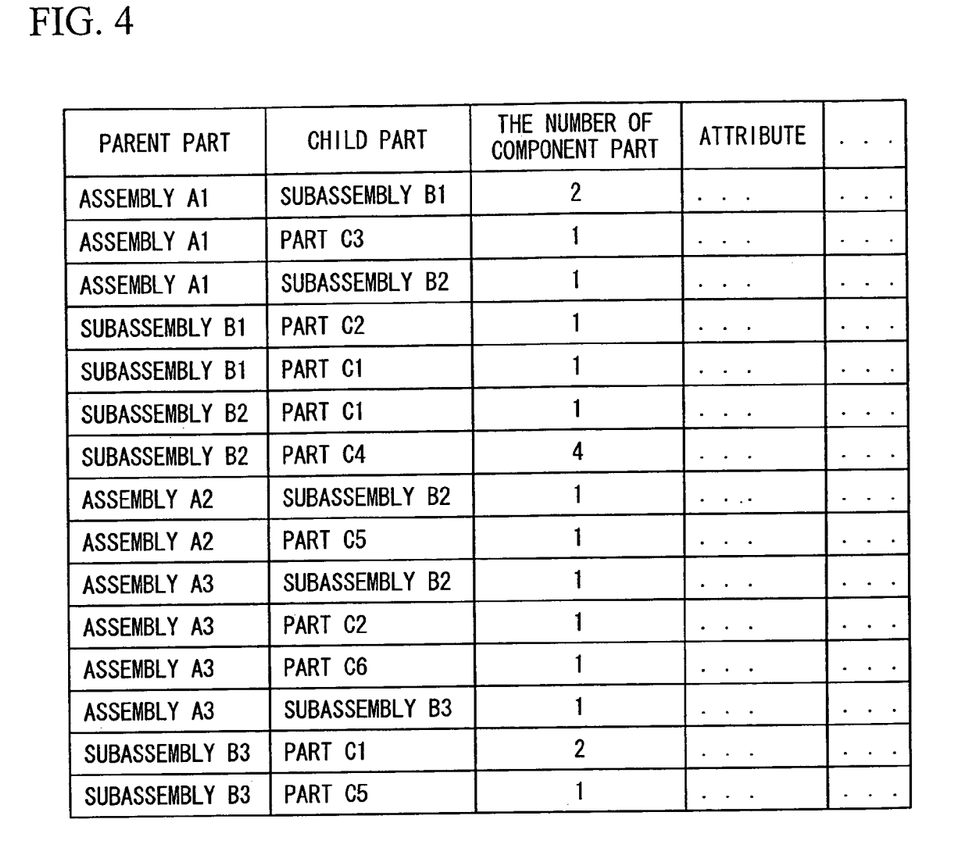
FIG. 4 shows an example of product structure data used with the apparatus for searching data for a similar article according to the present invention.

FIG. 4 shows a table representing the subassemblies and parts that constitute the three assemblies A1, A2, and A3 of FIG. 2. The number of component parts refers to the number of child parts contained in each parent part. Further, the column after attribute is a section in which data relevant to parental relation of assemblies, subassemblies, and parts can be recorded depending on the purpose.

Figure 5:
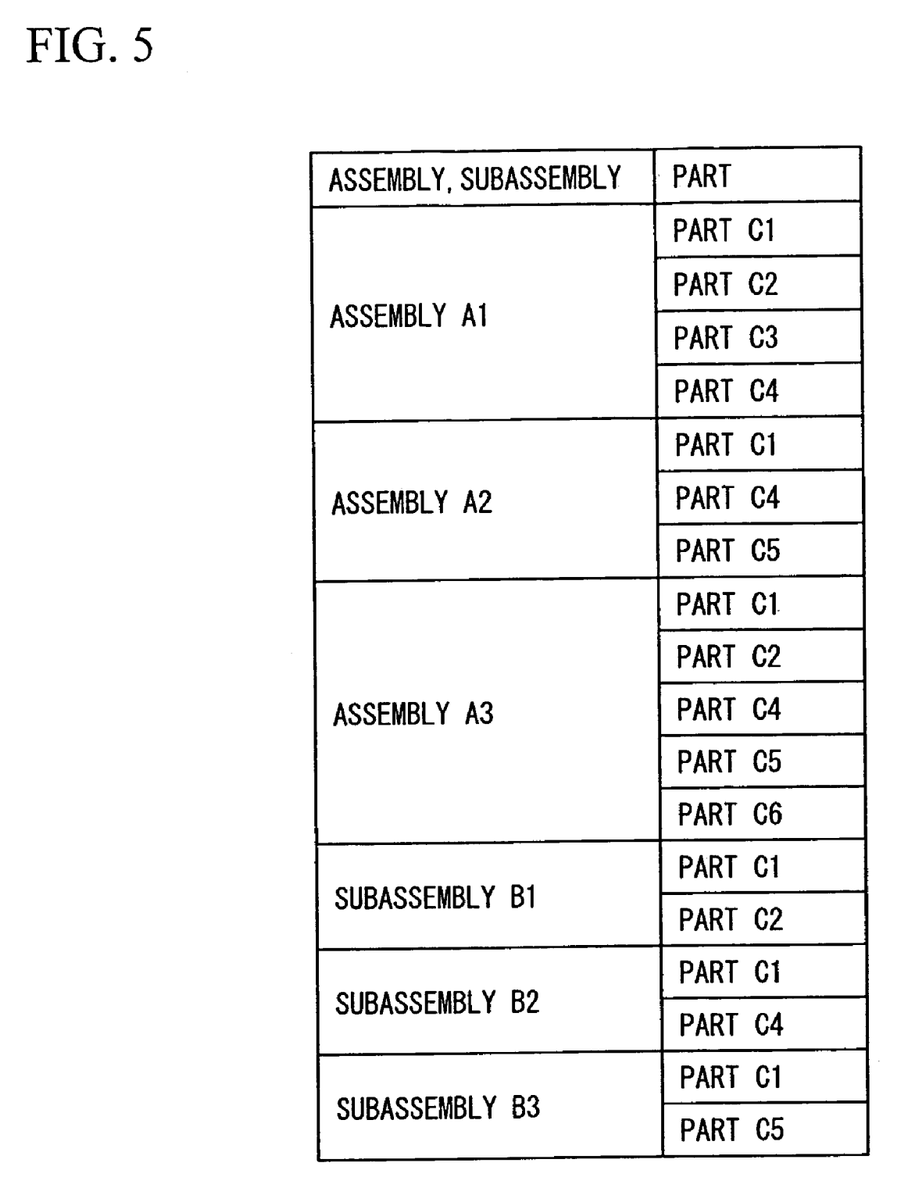
FIG. 5 shows an example of product structure data used with the apparatus for searching data for a similar article according to the present invention.
Figure 6:
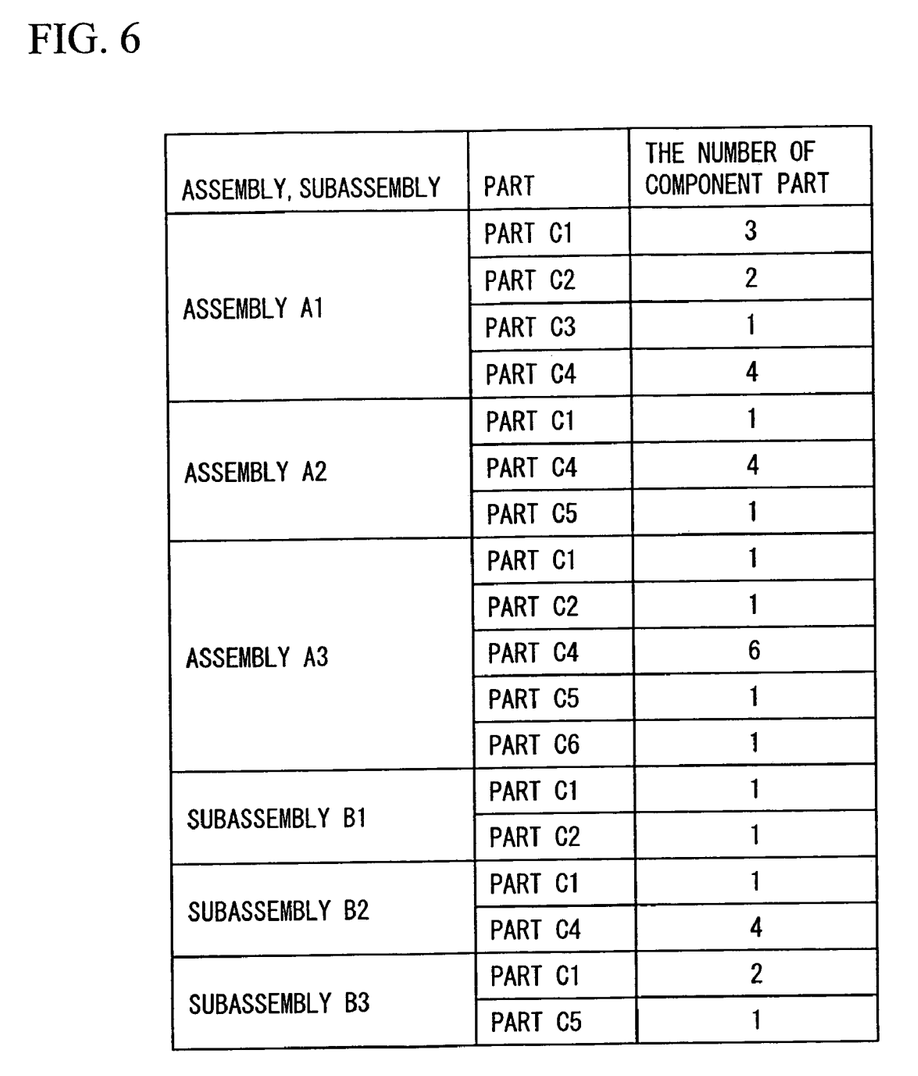
FIG. 6 shows an example of product structure data used with the apparatus for searching data for a similar article according to the present invention.

FIG. 5 shows a table of the parts that are the minimum constitutional units of the three assemblies A1, A2, and A3 of FIG. 2. In FIG. 5, only the parts that constitute the individual assemblies A1, A2, and A3 are shown, and the number of the parts is not shown. FIG. 6 is a table in which the number of the component parts for each part is added to the chart of FIG. 5.

Figure 1:
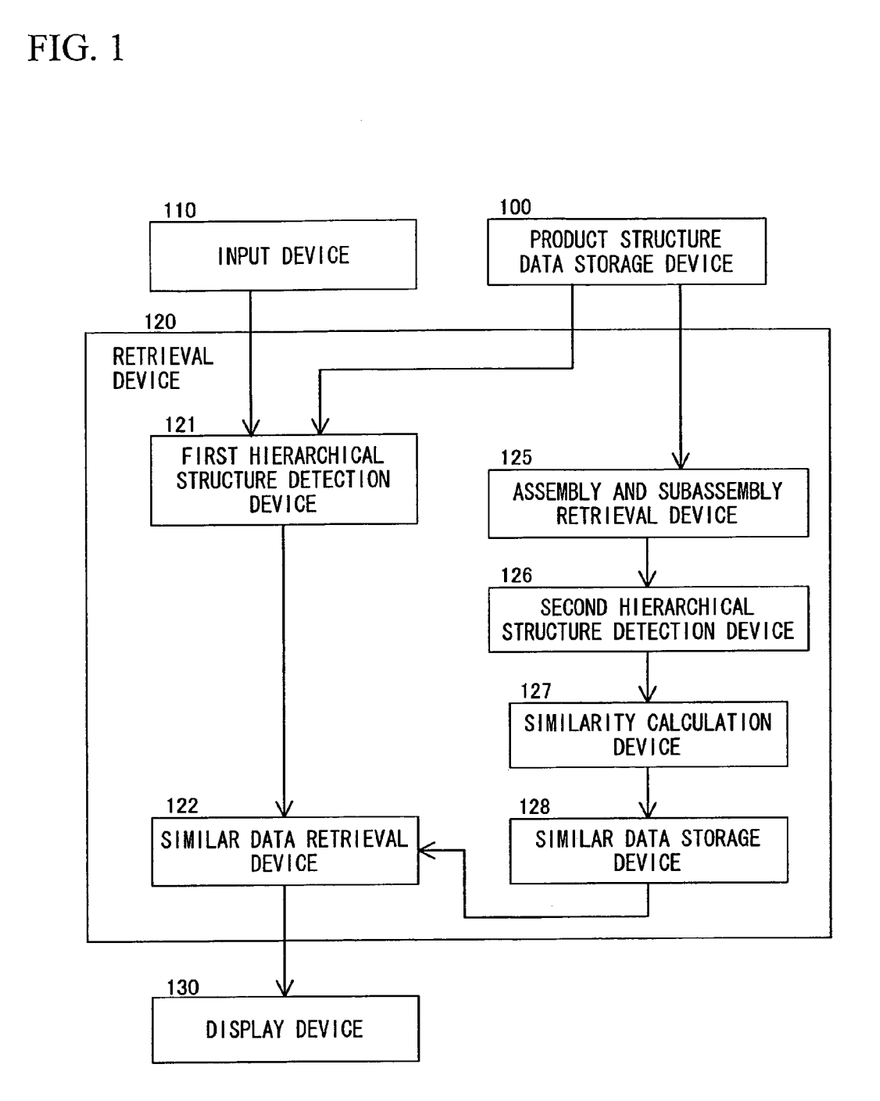
FIG. 1 shows an explanatory diagram for explaining the configuration of an apparatus for searching data for a similar article according to the present invention.

The configuration of an apparatus for searching data for a similar article according to the present invention will be described with reference to FIG. 1. The apparatus for searching data for a similar article according to the present embodiment comprises a product structure data storage device 100, an input device 110, a retrieval device 120, and a display device 130. While it is preferable that the retrieval device 120 is structured with a general-purpose computer executing a program for realizing a method of the present invention for searching data for a similar article, it can also be realized as a dedicated processing unit. While the program for realizing the method of the present invention for searching data for a similar article is stored in a main memory in the retrieval device 120 to be executed, it can also be executed by recording the program in a portable medium such as a CD-ROM and then storing it in another program storage unit. Further, such program can be transmitted to another device via a communication device, so as to use the program with the transmission destination device.

Data representing product structures as shown in FIG. 2 and FIG. 3 is stored in the product structure data storage device 100. Data actually recorded in the product structure data storage device 100 does not necessarily have to be in the format shown in FIG. 2 and FIG. 3, data shown in FIG. 4, FIG. 5, or FIG. 6 may be applicable.

The input device 110 is a device for receiving instructions to the retrieval device 120. Typical instructions include an instruction for specifying a target assembly or subassembly for similarity determination, and an instruction for initiating a retrieval processing. An operator can give such instructions interactively or via a communication device by connecting other computer systems, for example. Basically, a code or a name assigned to an assembly or a subassembly, such as A1 or B1, is used for the instruction for specifying such assembly or subassembly. As a more preferable method, there is also a system in which part of a code or a name is specified, and a selection is then specified among a plurality of displayed candidates. The display device 130 displays an input processing screen, an output processing screen, a similarity determination result display screen, and the like.

The retrieval device 120 comprises a first hierarchical structure detection device 121, a similar data retrieval device 122, an assembly and subassembly retrieval device 125, a second hierarchical structure detection device 126, a similarity calculation device 127, and a similar data storage device 128. The hierarchical structure detection processing performed by the first hierarchical structure detection device 121 is substantially the same as that by the second hierarchical structure detection device 126, and one of these two devices can be substituted with the other partly or wholly.

The details of processing in the retrieval device 120 will be described later. Here, processing of the similarity calculation device 127 and that of the similar data retrieval device 122 are described.

First, an example of a method for calculating similarity in the similarity calculation device 127 will be described. The most typical similarity is the percentage of common parts between two assemblies or subassemblies. Similarity between the assembly A1 and the assembly A2 shown in FIG. 2 and FIG. 3 is calculated. There are cases in which the number of each of component parts is taken into account or is not. First, a case in which the number of each of component parts is not taken into account will be described. As shown in FIG. 5, the number of types of the parts constituting the assembly A1 is 4, and the number of types of the parts constituting the assembly A2 is 3. Thus, the total types of the parts of the two assemblies A1 and A2 is 4+3=7. Of the seven types of parts, the parts common between the two assemblies A1 and A2 are the part C1 and part C4. The total number of the types of the common parts C1 and parts C4 is 4. Thus, the similarity is 4/7=57%.

Figure 7:
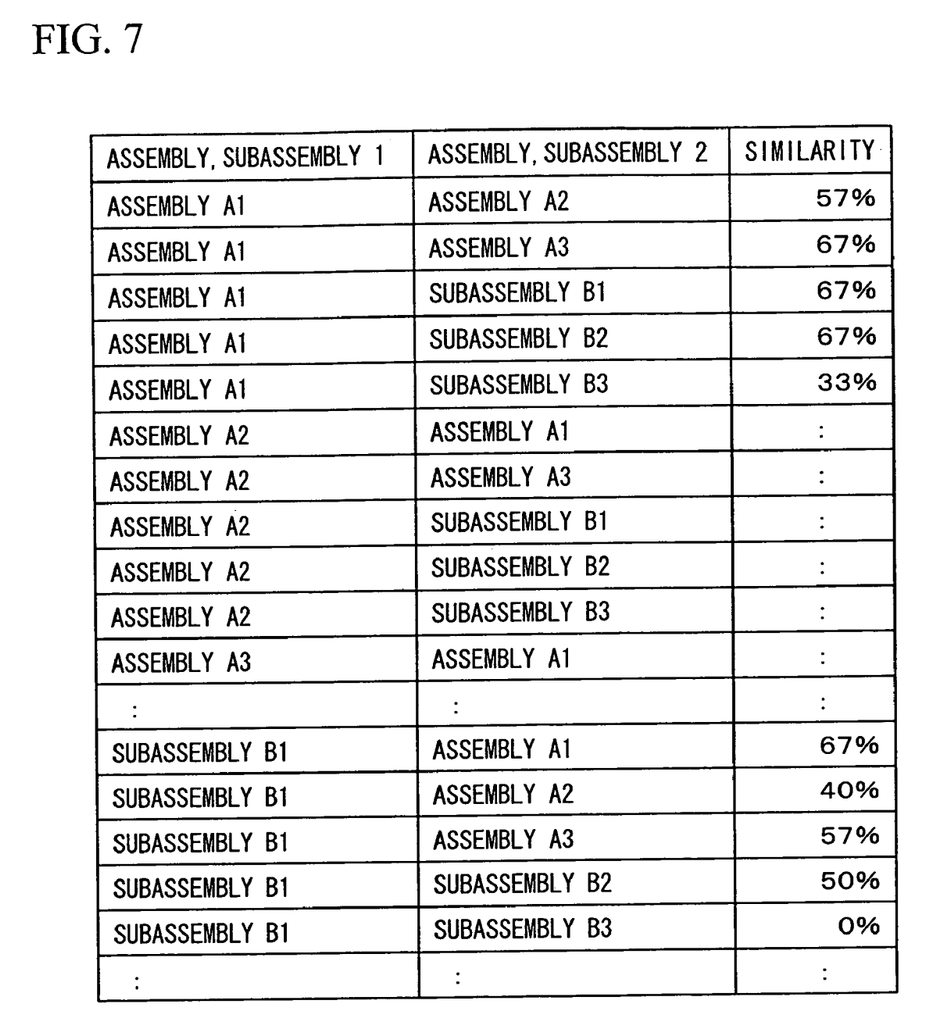
FIG. 7 shows an example of data including similarity calculated by the device for searching data for a similar article according to the present invention.

FIG. 7 shows results of similarity calculation when the number of each of component parts is not taken into consideration. There are shown calculated values of similarity between a part/subassembly 1 on the left and a part/subassembly 2 on the right. Similarity is 0% when there is no common part between two of the part/subassemblies.

Next, a case in which the number of each of component parts is taken into account will be described. When the number of each of component parts is taken into account, similarity can be calculated by using data of FIG. 6. As shown in FIG. 6, the total number of the parts constituting the assembly A1 is 3+2+1+4=10, and the total number of the parts constituting the assembly A2 is 1+4+1=6. Thus, the total number of the parts of the two assemblies A1 and A2 is 10+6=16. Of the 16 parts, the parts common between the two assemblies A1 and A2 are the parts C1 and parts C4. Three parts C1 are contained in the assembly A1, and one part C1 is contained in the assembly A2. Thus, the number of the common part C1 is 1. Four parts C4 are contained in the assembly A1 and also four parts C4 are contained in the assembly A2. Thus, the number of the common part C4 is 4. As a result, the number of the common parts is 1+4=5 and they are contained in the two assemblies A1 and A2. Thus, the total number of the common parts contained in the two assemblies A1 and A2 is 5+5=10. Thus, the similarity is 10/16=63%.

As the method for calculating similarity, two examples have been described. However, the method for calculating similarity in the similarity calculation device 127 is not limited to these examples.

Next, a process for determining similarity in the similar data retrieval device 122 will be described. The similar data retrieval device 122 has a predetermined threshold value. This threshold value may be inputted via the input device 110. For example, when the threshold value is 60%, a combination whose similarity is 60% or more is determined to be similar. In the example of FIG. 7, when the assembly A1 is a target for similarity determination, similarity with respect to the assembly A3, and the subassemblies B1 and B2 is 67%, which is greater than the threshold value 60%. Thus, the assembly A3, and the subassemblies B1 and B2 are determined to be similar to the assembly A1. When the threshold value is 50%, a combination whose similarity is 50% or more is determined to be similar. In the example of FIG. 6, when the assembly A1 is a target for similarity determination, similarity with respect to the assembly A2 is 57%, and it is greater than the threshold value 50%. Thus, the assembly A3, subassemblies B1 and B2, and the assembly A2 are determined to be similar to the assembly A1.

Figure 8:
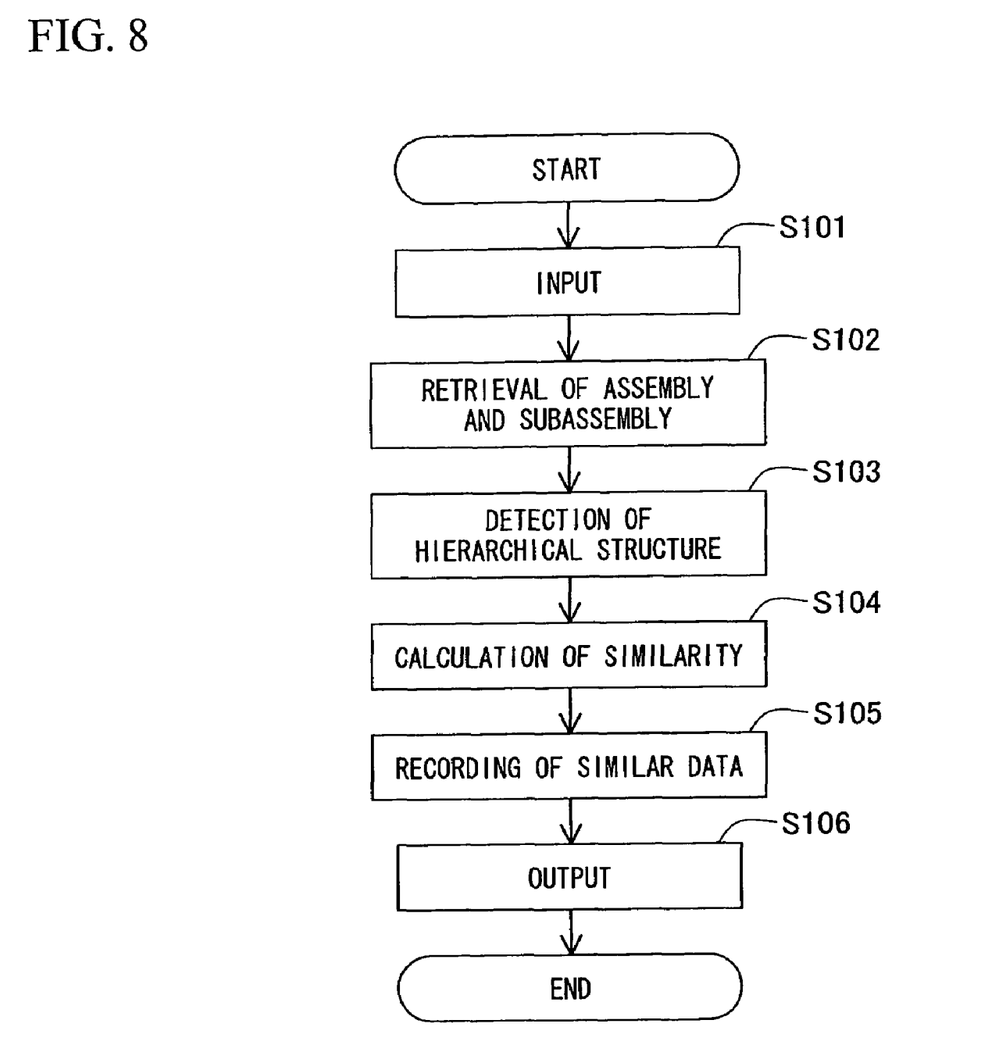
FIG. 8 shows an example of processing for creating and recording similar data in the device for searching data for a similar article according to the present invention.

A process for creating similarity data and storing the data will be described with reference to FIG. 8. In step S101, the retrieval device 120 inputs data concerning all the assemblies and subassemblies recorded in the product structure data storage device 100, based on instructions from the input device 110. In this example, data shown in FIG. 2 or FIG. 4 is recorded in the product structure data storage device 100. In step S102, the assembly-and-subassembly retrieval device 125 retrieves all the assemblies and subassemblies from the inputted data. For example, the data shown in FIG. 2 and FIG. 4 is searched for the assemblies A1, A2, and A3, and the subassemblies B1, B2, and B3.

In step S103, the second hierarchical structure detection device 126 detects hierarchical structures of the assemblies and subassemblies. In this example, the second hierarchical structure detection device 126 searches the data shown in FIG. 2 and FIG. 4 for parts that are the minimum constitutional units contained in each of the assemblies A1, A2, and A3, and the subassemblies B1, B2, and B3. In the data shown in FIG. 5 and FIG. 6, the parts contained in each of the assemblies A1, A2, and A3, and the subassemblies B1, B2, and B3 are known. Thus, when data shown in FIG. 5 and FIG. 6 is available, simply it can be used.

In step S104, the similarity calculation device 127 calculates similarity for each combination of assemblies or subassemblies. Namely, the device extracts a pair from the assemblies A1, A2, and A3, and the subassemblies B1, B2, and B3, so as to calculate similarity in each pair. Similarity is calculated for every possible pair. In this example, similarity is calculated based on the number of parts commonly contained in each pair.

For example, similarity is calculated for all the combinations of: the assemblies A1 and A2; assemblies A1 and A3; assembly A1 and subassembly B1; assembly A1 and subassembly B2; assembly A1 and subassembly B3; assemblies A2 and A3; assembly A2 and subassembly B1; assembly A2 and subassembly B2; assembly A2 and subassembly B3; assembly A3 and subassembly B1; assembly A3 and subassembly B2; assembly A3 and subassembly B3; subassemblies B1 and B2; subassemblies B1 and B3; and subassemblies B2 and B3. The method for calculating similarity in the similarity calculation device 127 is as described above.

In step S105, the similar data storage device 128 stores similarity. As shown in FIG. 7, the percentage representing similarity with respect to each combination is displayed (Output: S106). While all the calculation results may be recorded, alternatively, data concerning similarity more than a predetermined value alone may be recorded. When data concerning similarity is obtained in this way, determination of similarity is carried out.

Figure 9:
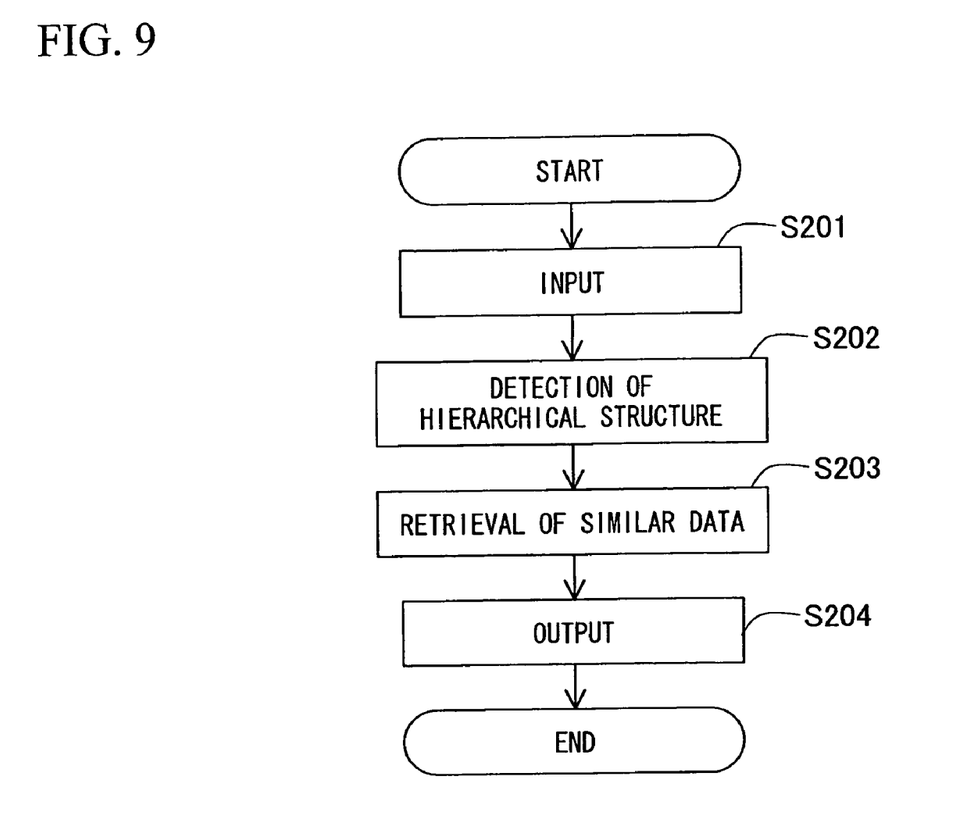
FIG. 9 shows an example of processing for searching for similar data in the apparatus for searching data for a similar article according to the present invention.

A process for determining similarity will be described with reference to FIG. 9. In step S201, based on instructions from the input device 110, the retrieval device 120 inputs a target assembly or subassembly for similarity determination, using data recorded in the product structure data storage device 100. In this example, the assembly A1 is used as a target for similarity determination.

In step S202, the first hierarchical structure detection device 121 detects a hierarchical structure of a target assembly or subassembly for similarity determination. In this example, the first hierarchical structure detection device 121 detects the hierarchical structure of the assembly A1, thereby detecting that the assembly A1 is composed of two subassemblies B1, one part C3, and one subassembly B2.

In step S203, the similar data retrieval device 122 searches the similar data storage device 128 for assemblies or subassemblies that are similar to a target assembly or subassembly for similarity determination. In this example, assemblies or subassemblies similar to the assembly A1 is searched for. Further, assemblies or subassemblies similar to the subassemblies B1 and B2 contained in the assembly A1 are searched for. The method for determining similarity in the similar data retrieval device 122 is as described above. Thus, in the present example, when the assembly A1 is designated as a target for similarity determination, not only assemblies or subassemblies similar to the assembly A1, but also assemblies or subassemblies similar to the subassemblies B1 and B2 that are the child parts of the assembly A1 are searched for.

In step S204, search results retrieved by the similar data retrieval device 122 are displayed on the display device 130. For example, when the assembly A1 is designated as a target for similarity determination by the input device 110, data such as the following data concerning similar articles is displayed on the display device 130. Note that the threshold value in the similar data retrieval device 122 is 50%.

A3: 67%
B1: 67%
B2: 67%
A2: 57%

When the subassembly B1 is designated as a target for similarity determination by the input device 110, the following data concerning similar articles is displayed on the display device 130, for example. Note that the threshold value in the similar data retrieval device 122 is 50%.

A1: 67%
A3: 57%
B2: 50%

Figure 10:
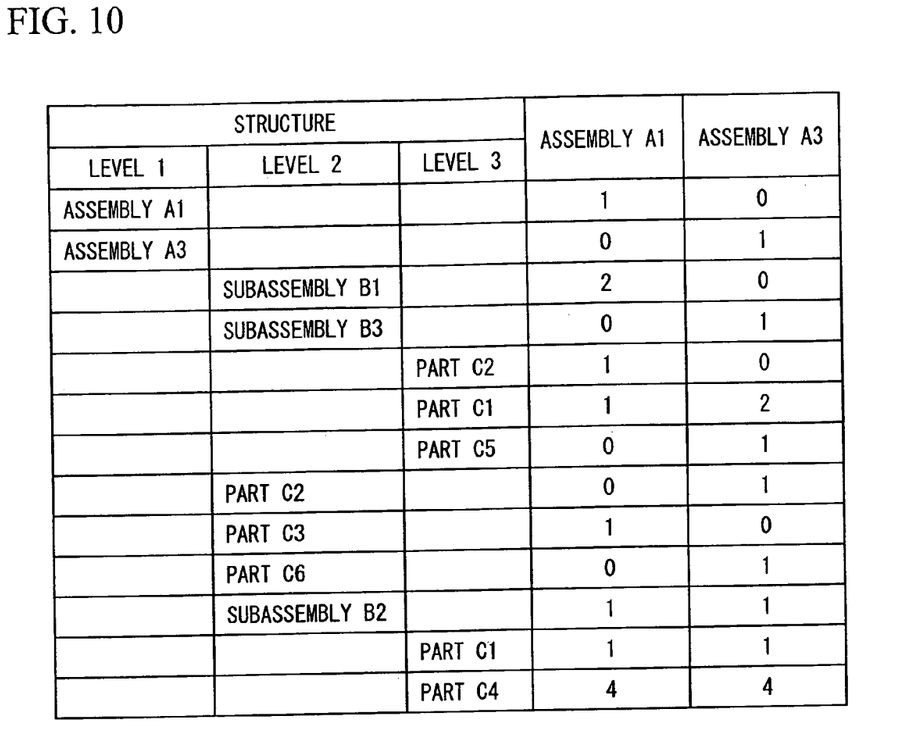
FIG. 10 shows an example of search result data obtained by the apparatus for searching data for a similar article according to the present invention.

FIG. 10 shows a display example of search results displayed on the display device 130. In this example, when the assembly A1 is designated as a target for similarity determination, the assembly A3 is determined to be similar and thus retrieved. In this example, the hierarchical structure of the target assembly A1 for similarity determination, and that of the assembly A3 similar to the assembly A1 are shown. The hierarchical structures are classified into three levels. Level 1 represents the highest-order assemblies, level 2 represents the subassemblies or parts that are the child parts of the assemblies, and level 3 represents the parts that are the child parts of the subassemblies. While classification is made into three levels in this example, many more levels may be used for classification.

In the column of level 1, the target assembly A1 for similarity determination and the assembly A3 similar to the assembly A1 are displayed. Namely, the assemblies A1 and A3 in the left column of the hierarchical structures of FIG. 2 are displayed. In the column of level 2, the child parts of the level-1 assemblies A1 and A3 are displayed. Namely, the subassemblies and parts in the middle column of the hierarchical structures of FIG. 2 are displayed. In the column of level 3, the child parts of the level-2 subassemblies and parts are displayed. Namely, the parts in the right column of the hierarchical structures of FIG. 2 are displayed.

One assembly, subassembly, or part is displayed in one row. Those arranged one above the other in the same level are brothers or different items. For example, the assembly A1 and the assembly A3 in the column of level 1 are different items, and the part C2 and the part C1 in the column of level 3 are brothers. Parental relation is diagonally shown. Namely, child parts are shown to the lower right of a parent part. For example, the child parts, the parts C2 and C1, are shown to the lower right of their parent part, the subassembly B1. The child parts, the parts C1 and C5, are shown to the lower right of their parent part, the subassembly B3.

Two columns on the right side show the number of each of the subassemblies or parts contained in the assembly A1 and the assembly A3. When the number is 1 or more in both of the columns of assembly A1 and assembly A3, the relevant subassembly or part is contained in both the assembly A1 and the assembly A3. For example, the number of the level-2 subassembly B2 is 1 in both of the columns of the assembly A1 and the assembly A3. This means that the subassembly B2 is contained in both the assembly A1 and the assembly A3.

The display color of the subassembly B2 and the parts C1 and C4 contained therein may be different from that of other sections.

Figure 11:
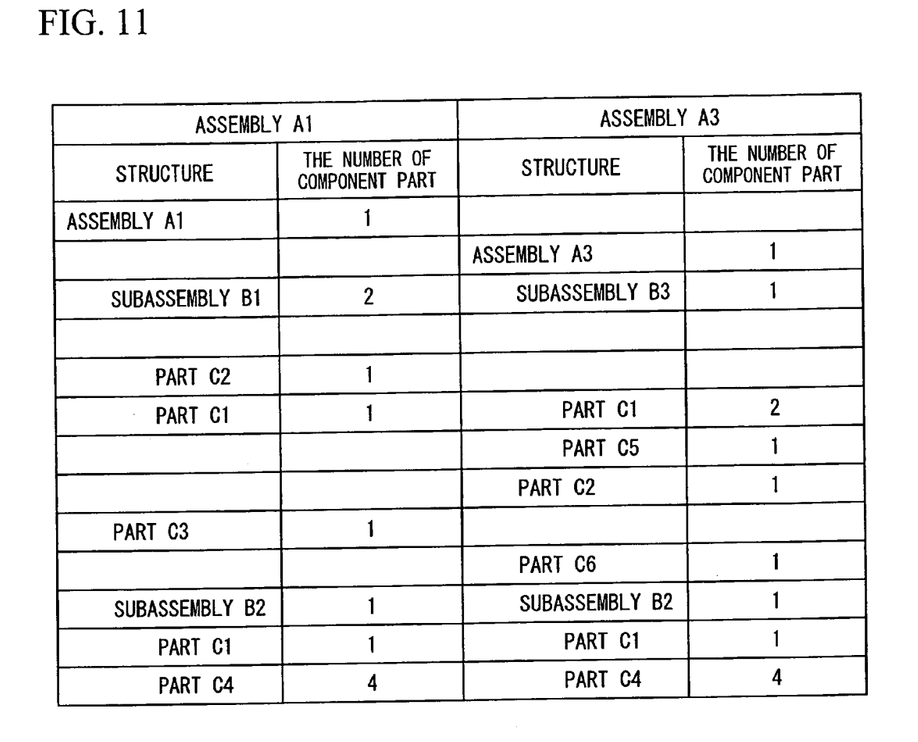
FIG. 11 shows an example of search result data obtained by the apparatus for searching data for a similar article according to the present invention.

FIG. 11 shows another display example of search results displayed on the display device 130. In this example, when the assembly A1 is designated as a target for similarity determination, the assembly A3 is determined to be similar and thus retrieved. In this example, the hierarchical structure of the target assembly A1 for similarity determination, and that of the assembly A3 similar to the assembly A1 are shown. In the columns of "structure" of the assemblies A1 and A3, the subassemblies and parts contained in the assemblies A1 and A3 are displayed, and in the columns of "number of component part" of the assemblies A1 and A3, the number of the individual subassembly or part is shown. The assembly A1 is shown in the first row, and the assembly A3 is shown in the second row. In the column "structure" of the assembly A1, the subassemblies and parts that correspond to those in level 2 of FIG. 10 are shown under the assembly A1 with one character of indent provided, and the parts that correspond to those in level 3 of FIG. 10 are shown below with one character of indent provided. The number of the subassembly B2 is 1 in both columns of "number of component part" of the assembly A1 and the assembly A3. This means that the subassembly B2 is contained in both the assembly A1 and the assembly A3.

The display color of the subassembly B2 and the parts C1 and C4 contained therein may be different from that of other sections.

The examples described with reference to FIG. 10 and FIG. 11 are a case in which the assembly A1 is designated as a target for similarity determination and the assembly A3 is determined to be similar as a search result. However, in accordance with the present invention, as described in step S203, not only parts similar to a target assembly for similar determination, but also subassemblies or parts similar to the subassemblies and parts contained in the target assembly for similarity determination can be retrieved.

Figure 12:
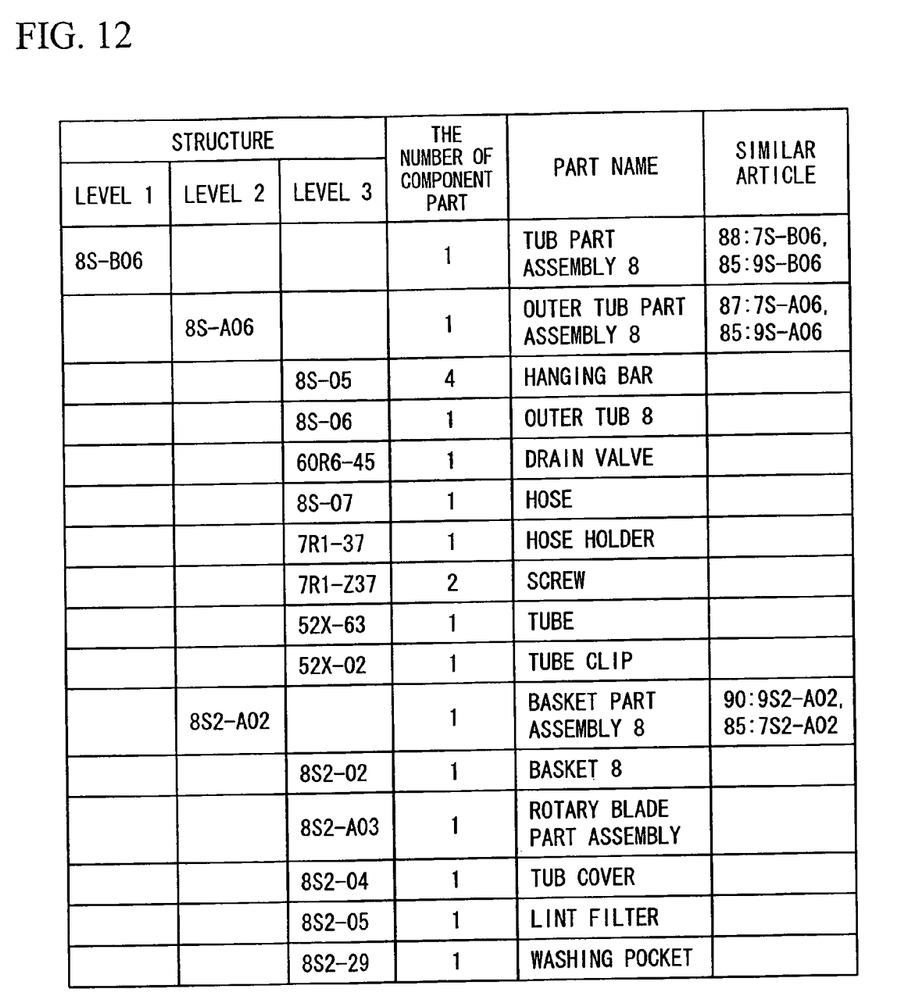
FIG. 12 shows an example of search result data obtained by the apparatus for searching data for a similar article according to the present invention.

FIG. 12 shows search results when the entire assembly of a washing machine tub, which is a part of an electric washing machine, is designated as a target for similarity determination. The part name of the entire assembly of this washing machine tub is "tub part assembly 8," and its reference character is "8S-B06." As search results, not only all the entire assemblies of washing machine tubs similar to the target "tub part assembly 8" for similarity determination, but also parts similar to the child parts of the target "tub part assembly 8" for similar determination have been retrieved. In the section "structure" on the left side of the chart, reference characters of the subassemblies and parts contained in the target "tub part assembly 8" for similarity determination are listed. As in the example of FIG. 10, these subassemblies and parts are classified into three levels to be displayed.

Level 1 represents the highest-order assemblies, level 2 represents the subassemblies and parts that are the child parts of the assemblies, and level 3 represents the parts that are the child parts of the subassemblies. While classification is made into three levels in this example, many more levels may be used for classification.

As in the example of FIG. 10, one assembly, subassembly, or part is displayed in one row. Those arranged one above the other in the same level are brothers. For example, in the column of level 2, subassemblies 8S-A06 and 8S2-A02 are brothers. Parental relation is diagonally shown. Namely, child parts are shown to the lower right of a parent part. For example, the child parts, the parts 8S2-02, 8S2-A03, 8S2-04, 8S2-05, and 8S2-29, are shown to the lower right of their parent subassembly 8S2-A02.

In the middle column of the table, the number of the target assembly for similarity determination, and the number of the subassembly and part contained therein are displayed. In the column to the right of the column of "number of component part", the "part name" of the target assembly for similarity determination and the subassemblies and parts contained therein are displayed. As described above, the "part name" of the target for similarity determination is "tub part assembly 8."

Column "Similar article", which is the results of similarity determination, is shown in the rightmost column of the table. For example, as the assemblies similar to the target "tub part assembly 8" for similarity determination, assemblies with a reference character 7S-B06 and a reference character 9S-B06 have been retrieved. Similarity to the assembly with the reference character 7S-B06 is 88%, and similarity to the assembly with the reference character 9S-B06 is 85%.

In this table, the subassemblies or parts similar to the subassemblies of the target "tub part assembly 8" for similarity determination are displayed. Subassemblies with a reference character 7S-A06 and with a reference character 9S-A06 have been retrieved as the subassemblies similar to an "outer tub part assembly 8" that is a subassembly of the "tub part assembly 8." Similarity to the subassembly with the reference character 7S-A06 is 87%, and similarity to the subassembly with the reference character 9S-A06 is 85%.

Subassemblies with a reference character 9S2-A02 and a reference character 7S2-A02 have been retrieved as the subassemblies similar to a "basket part assembly 8," which is a subassembly of the "tub part assembly 8." Similarity to the subassembly with the reference character 9S2-A02 is 90%, and similarity to the subassembly with the reference character 7S2-A02 is 85%.

Thus, in accordance with the present example, articles similar to the entire or part of a target article for similarity determination can be retrieved. Thus, when only articles similar to the entire target article for similarity determination need to be determined, it is only necessary to use search results concerning the level-1 assemblies. When parts similar to the parts contained a target article for similarity determination need to be determined, it is only necessary to use search results concerning the level-2 subassemblies.

It may be structured so that when one of the part names displayed in the column of "part name" on the right side of FIG. 12 is clicked, subassemblies or parts similar to the subassembly or part in the "part name" are displayed in the column "similar article." For example, the column of "similar article" on the right side is blank on the initial screen, and when the "basket part assembly 8" in the column of "part name" is clicked, "90:9S2-A02" and "85:7S2-A02" are displayed in the column "similar article" as the search results.

Figure 13:
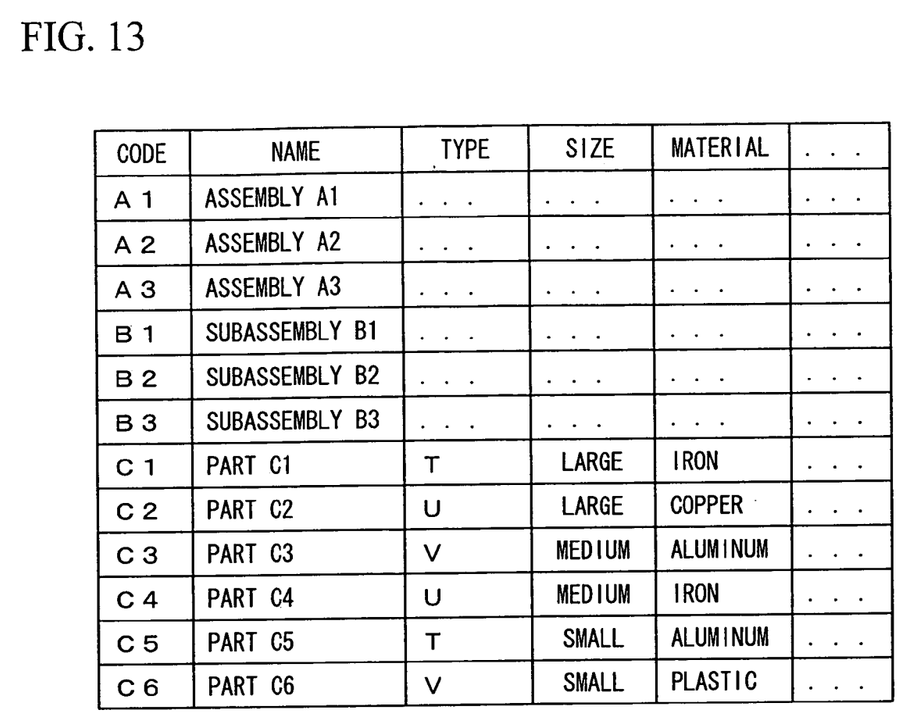
FIG. 13 shows an example of product specification data used in the apparatus for searching data for a similar article according to the present invention.

FIG. 13 shows another example of the data format stored in the product structure data storage device 100. The examples of data shown in FIG. 2 to FIG. 5 show hierarchical structures composed of assemblies, subassemblies, and parts. Namely, the examples show layers of parent-child part relation. Thus, basically, they are based on the number of each individual child part contained in their parent part, that is, the number of each individual component part.

In the example of FIG. 13, specification values are used instead of the number of child parts contained in their parent part. As shown in the figure, a "code" of an assembly, subassembly, or part is displayed in the first column, a "name" of the assembly, subassembly, or part is displayed in the second column, a "type" of the assembly, subassembly, or part is displayed in the third column, a "size" of the assembly, subassembly, or part, is displayed in the fourth column, and a "material" of the assembly, subassembly, or part is displayed in the fifth column.

Next, a method for calculating similarity will be described. Specification, such as type, size, or material, is compared between two target assemblies or subassemblies for similarity determination. Weight is previously set such that, for example, 5 points is obtained when the type is matched, 2 points when the size is matched, and 3 points when the material is matched. For example, in the example of FIG. 13, similarity is 5 points since only the type is matched between the part C2 and the part C4, and similarity is 0 point since no specification is matched between the part C1 and the part C3. Since the type, size, and material are matched between two identical parts C1, similarity is 5+3+2=10 points.

For example, similarity between the subassembly B1 and the subassembly B2 is calculated. Similarity between the part C1 contained in the subassembly B1 and the part C1 contained in the subassembly B2 is 10 points, and similarity between the part C2 contained in the subassembly B1 and the part C4 contained in the subassembly B2 is 5 points. Thus, similarity between the subassembly B1 and the subassembly B2 is 10+5=15 points. When similarity calculated in this way is greater than a predetermined threshold value, the subassembly B1 and the subassembly B2 can be determined to be similar to each other.

Thus, in accordance with the present example, similar assemblies and subassemblies can be retrieved even in the case of a product having a completely different part number. In this example, while similarity has been calculated based on specifications, it is also possible to determine similarity by combining similarity calculated in this way and similarity calculated based on the number of each individual component part as described above.

While examples of the present invention have been described above, the present invention is not limited to the above examples. It should be easily understood by one of ordinary skill in the art that various changes may be made within the scope of the claims without departing from the spirit of the invention.

What is claimed is:

1. An apparatus machine for searching data for a similar article, comprising:
    a product structure data storage device for storing data concerning assemblies, and subassemblies and parts contained in the assemblies;
    a hierarchical structure detection device for detecting hierarchical structures of the assemblies and subassemblies from data stored in the product structure data storage device;
    a similarity calculation device for calculating similarity of all the combinations of the assemblies and subassemblies based on the hierarchical structures detected by the hierarchical structure detection device;
    a similar data storage device for storing the hierarchical structures of the assemblies and subassemblies, and similarity for each combination of the assemblies and subassemblies, and;
    a similar data retrieval device for searching the assemblies and subassemblies stored in the similar data storage device, for assemblies and subassemblies similar to a target assembly or subassembly for similarity determination inputted via an input device; and
    a display device for displaying the assemblies and subassemblies retrieved by the similar data retrieval device;
    wherein the display device displays a hierarchical structure of a target assembly or subassembly for similarity determination, and those of the assemblies or subassemblies similar to the target assembly or subassembly;
    wherein the display device displays the target assembly or subassembly for similarity determination and the assemblies similar thereto as hierarchical structures classified into at least three levels, such that the assemblies are classified into level 1, the subassemblies or parts that are child parts of the assemblies are classified into level 2, and parts that are child parts of the subassemblies are classified into level 3; and
    wherein the display device displays the number of each of component parts of the target assembly or subassembly for similarity determination, and the number of each of component parts of the subassemblies and parts contained in an assembly similar to the target assembly or subassembly.

2. The apparatus machine for searching data for a similar article according to claim 1, wherein the similarity is determined based on the percentage of common parts between two of the assemblies or subassemblies.

3. The apparatus machine for searching data for a similar article according to claim 1,
wherein the similarity is determined based on the number of common specifications between two of the assemblies or subassemblies.

4. The apparatus machine for searching data for a similar article according to claim 1,
wherein the similar data retrieval device determines the assemblies or subassemblies whose similarity is greater than a predetermined threshold value to be similar to a target assembly or subassembly for similarity determination.

5. A computer-implemented method including a processor programmed for searching data for a similar article, comprising:
inputting data concerning assemblies, and the subassemblies and parts contained in the assemblies;
detecting hierarchical structures of the assemblies or subassemblies based on the data;
calculating similarity for all the combinations obtained from the assemblies and subassemblies contained in the hierarchical structures;
storing the hierarchical structures of the assemblies and subassemblies, and similarity for each combination of assemblies and subassemblies in a storage device;
inputting a target assembly or subassembly for similarity determination via an input device;
searching the assemblies and subassemblies stored in the storage device for the assemblies or subassemblies similar to the target assembly or subassembly for similarity determination; and
displaying search results on a display device;
wherein a hierarchical structure of a target assembly or subassembly for similarity determination, and those of the assemblies and subassemblies similar to the target assembly or subassembly, are displayed in the display step;
wherein the displaying displays the target assembly or subassembly for similarity determination and the assemblies similar thereto as hierarchical structures classified into at least three levels, such that the assemblies are classified into level 1, the subassemblies or parts that are child parts of the assemblies are classified into level 2, and parts that are child parts of the subassemblies are classified into level 3; and
wherein the displaying displays the number of each of component parts of the target assembly or subassembly for similarity determination, and the number of each of component parts of the subassemblies and parts contained in an assembly similar to the target assembly or subassembly.

6. The method for searching data for a similar article according to claim 5,
wherein the similarity is determined based on the percentage of common parts between two of the assemblies or subassemblies.

7. The method for searching data for a similar article according to claim 5,
wherein the similarity is determined based on the number of common specification items between two of the assemblies or subassemblies.

8. The method for searching data for a similar article according to claim 5,
wherein the assemblies or subassemblies whose similarity is greater than a predetermined threshold value are determined to be similar to a target assembly or subassembly for similarity determination in the searching step.

9. A computer-readable storage medium embodying a program thereon carried out by a computer to perform the method for searching data for a similar article according to any one of claims 5 to 8.

10. An apparatus machine for searching data for a similar article, comprising:
a product structure data storage device for storing data concerning assemblies, and subassemblies and parts contained in the assemblies;
a hierarchical structure detection device for detecting hierarchical structures of the assemblies and subassemblies from data stored in the product structure data storage device;
a similarity calculation device for calculating a similarity degree of all the combinations of the assemblies and subassemblies based on the hierarchical structures detected by the hierarchical structure detection device;
a similar data storage device for storing the hierarchical structures of the assemblies and subassemblies, and the similarity degree for each combination of the assemblies and subassemblies, and;
a similar data retrieval device for searching the assemblies and subassemblies stored in the similar data storage device, for assemblies and subassemblies having the similarity degree which is at least as great as a predetermined threshold, with a target assembly or subassembly for similarity determination inputted via an input device; and
a display device for displaying the assemblies and subassemblies retrieved by the similar data retrieval device;
wherein the display device displays a hierarchical structure of a target assembly or subassembly for similarity determination, and those of the assemblies or subassemblies similar to the target assembly or subassembly;
wherein the display device displays the target assembly or subassembly for similarity determination and the assemblies similar thereto as hierarchical structures classified into at least three levels, such that the assemblies are classified into level 1, the subassemblies or parts that are child parts of the assemblies are classified into level 2, and parts that are child parts of the subassemblies are classified into level 3; and
wherein the display device displays the number of each of component parts of the target assembly or subassembly for similarity determination, and the number of each of component parts of the subassemblies and parts contained in an assembly similar to the target assembly or subassembly.

* * * * *